United States Patent
Tajima (10) Patent No.: US 9,503,270 B2
(45) Date of Patent: Nov. 22, 2016

(54) COMMUNICATION DEVICE AND POWER SAVING METHOD THEREOF IN DATA TRANSMISSION SYSTEM

(71) Applicant: NEC CORPORATION, Tokyo (JP)

(72) Inventor: Akio Tajima, Tokyo (JP)

(73) Assignee: NEC CORPORATION, Tokyo (JP)

(*) Notice: Subject to any disclaimer, the term of this patent is extended or adjusted under 35 U.S.C. 154(b) by 124 days.

(21) Appl. No.: 14/388,866

(22) PCT Filed: Mar. 21, 2013

(86) PCT No.: PCT/JP2013/001900
§ 371 (c)(1),
(2) Date: Sep. 29, 2014

(87) PCT Pub. No.: WO2013/145651
PCT Pub. Date: Oct. 3, 2013

(65) Prior Publication Data
US 2015/0071303 A1    Mar. 12, 2015

(30) Foreign Application Priority Data

Mar. 28, 2012 (JP) ................. 2012-073151

(51) Int. Cl.
*H04L 12/14* (2006.01)
*H04L 12/12* (2006.01)
(Continued)

(52) U.S. Cl.
CPC ........... *H04L 12/12* (2013.01); *H04J 14/0254* (2013.01); *H04J 14/0267* (2013.01);
(Continued)

(58) Field of Classification Search
None
See application file for complete search history.

(56) References Cited

U.S. PATENT DOCUMENTS 3,564,149 A * 2/1971 Funk et al. .................. 379/222
5,943,147 A * 8/1999 Vanoli et al. ................. 398/27
(Continued)

FOREIGN PATENT DOCUMENTS

| JP | 2000-069119 | 3/2000 |
| JP | 2010-213259 | 9/2010 |
| JP | 2011-077795 | 4/2011 |

OTHER PUBLICATIONS

Amendment to IEEE STD 802.3-2008: CSMA/CD—Insert a new Clause 78 after Clause 77 as follows: 78. Energy-Efficient Ethernet (EEE)—IEEE Std 802.3az-2010—Authorized licensed use limited to : NEC. Downloaded on Feb. 14, 2011 at 6:20:48 UTC from IEEE Xplore. Restrictions apply. pp. 243-262.
Amendment to IEEE Std 802.3-2008: CSMA/CD—Insert the following new subclauses and corresponding annexes as follows: 80. Introduction to 40 Gb/s and 100 Gb/s networks—IEEE Std. 802. 3ba-2010 pp. 107-121.
(Continued)

*Primary Examiner* — Chi H Pham
*Assistant Examiner* — Shick Hom
(74) *Attorney, Agent, or Firm* — Young & Thompson (57) ABSTRACT

A communication device and a power saving method in a data transmission system are provided that can achieve the prevention of element deterioration occurring when a check signal is transmitted during sleep, as well as reductions of transmission noise and power consumption. The communication device, which is connected to another communication device through transmission/reception links corresponding to multiple channels, respectively, includes communication sections corresponding to the multiple channels, respectively, and a control section that interrupts transmission outputs of the communication element when there is no data for transmission, and sequentially changes, among the multiple channels, a channel that transmits a check signal for checking a link state during a period in which the transmission outputs are kept interrupted.

21 Claims, 9 Drawing Sheets

OPERATIONS ON SENDING AND RECEIVING SIDES
(FIRST EXEMPLARY EMBODIMENT)

(51) Int. Cl.
*H04L 29/06* (2006.01)
*H04Q 11/00* (2006.01)
*H04J 14/02* (2006.01)
*H04L 12/26* (2006.01)

(52) U.S. Cl.
CPC .......... *H04J14/0282* (2013.01); *H04L 69/14* (2013.01); *H04Q 11/0067* (2013.01); *H04J 14/0221* (2013.01); *H04L 43/0876* (2013.01); *H04Q 2011/0088* (2013.01); *Y02B 60/32* (2013.01); *Y02B 60/33* (2013.01); *Y02B 60/34* (2013.01)

(56) References Cited

U.S. PATENT DOCUMENTS 6,714,522 B1 * 3/2004 Lee ................................ 370/318
2010/0118753 A1 5/2010 Mandin et al.
2010/0302966 A1 * 12/2010 Matsuura ...................... 370/252

OTHER PUBLICATIONS

International Search Reported—PCT/JP2013/001900—May 14, 2013.

* cited by examiner

| SLEEP PERIOD | Sleep 1 | Sleep 2 | Sleep 3 | Sleep 4 |
|---|---|---|---|---|
| REFRESH SIGNAL TRANSMITTING CHANNEL | Ch.1 | Ch.2 | Ch.3 | Ch.4 |

FIG. 6B

| SLEEP PERIOD | Sleep 1 | Sleep 2 | Sleep 3 | Sleep 4 |
|---|---|---|---|---|
| REFRESH SIGNAL TRANSMITTING CHANNEL | Ch.3 | Ch.2 | Ch.4 | Ch.1 |

| REFRESH SIGNAL TRANSMITTING TIMING | Refresh 1 | Refresh 2 | Refresh 3 | Refresh 4 |
|---|---|---|---|---|
| REFRESH SIGNAL TRANSMITTING CHANNEL | Ch.1 | Ch.2 | Ch.3 | Ch.4 |

FIG. 9B

| REFRESH SIGNAL TRANSMITTING TIMING | Refresh 1 | Refresh 2 | Refresh 3 | Refresh 4 |
|---|---|---|---|---|
| REFRESH SIGNAL TRANSMITTING CHANNEL | Ch.3 | Ch.2 | Ch.4 | Ch.1 |

COMMUNICATION DEVICE AND POWER SAVING METHOD THEREOF IN DATA TRANSMISSION SYSTEM

TECHNICAL FIELD

The present invention relates to a high-speed data transmission system through multiple lanes and, more particularly, to a data transmission system in which sleep operation depending on data traffic is introduced, as well as a communication device and a power saving method.

BACKGROUND ART

For next high-speed Ethernet (Ethernet is a trademark; the same will apply hereinafter) after currently prevailing 10 Gigabit Ethernet (10 GbE), 40 Gigabit Ethernet (40 GbE) and 100 Gigabit Ethernet (100 GbE) were standardized in 2010 by IEEE 802.3ba Task Force (see NPL 1). Although 10 GbE provides for the 10 GBASE-LX4 specification based on Coarse Wavelength Division Multiplex (CWDM), the main body thereof is 10 GBASE-SR/LR/ER based on serial transmission.

On the other hand, in 40 GbE and 100 GbE, although the 40-Gb/s serial transmission standard is provided, its main scheme is parallel (multi-lane) transmission with 4 channels (40 GBASE-SR4/LR4: 10 Gb/s×4=40 Gbps, 100 GBASE LR4/ER4: 25 Gb/s×4=100 Gb/s) or 10 channels (100 GBASE-SR10: 10 Gb/s×10=100 Gb/s), taking into account transmission distance, device operation speed, cost, and the like.

Moreover, for a power saving technology in Ethernet, IEEE 802.3az Energy Efficient Ethernet (EEE) was standardized in 2010 (NPL 2). This standard is comprised of two technologies, namely: the LPI (Low Power Idle) scheme, in which when there is no data for transfer, the state is fallen in sleep, during which a heart beat signal (also referred to as a refresh signal) is transmitted to distinguish it from a link fault and allow its aliveness to be checked; and Rapid PHY Control, in which transmission rate is slowed. However, in IEEE 802.3ba Ethernet Task Force, no discussion has been given on power saving through the adaptive control of Ethernet interface depending on traffic.

PTL 1 discloses a technology in which the traffic volume in a low-speed Ethernet is monitored, and an increase or a decreased in the number of lanes used at 40 BbE or 100 GbE interface is determined depending on the traffic volume. In the case where the number of lanes is decreased, a lane or lanes used at 40 GbE or 100 GbE interface are suspended, and thereafter a lane or lanes used at 40 GbE or 100 GbE interface of the device at the other end are suspended. In the case where the number of lanes is increased, a lane or lanes unused at 40 GbE or 100 GbE interface are restored, and thereafter a lane or lanes unused at 40 GbE or 100 GbE interface of the device at the other end are restored.

CITATION LIST

Patent Literature

[PTL 1]
Japanese Patent Application Unexamined Publication No. 2011-077795

Non Patent Literature

[NPL 1]
IEEE 802.3ba 40 Gb/s and 100 Gb/s Ethernet
[NPL 2]
IEEE 802.3az Energy Efficient Ethernet

SUMMARY OF INVENTION

Technical Problem

However, the EEE described in NPL 2 is a technology that supports transmission over transmission media other than optical fiber, such as electric cable and backplane, and gives no discussion about 40 GbE or 100 GbE.

In a case where the LPI scheme of the EEE is applied to 40 GbE or 100 GbE, for example, when a refresh signal for checking whether or not a link is alive during sleep is transmitted over a specific channel (ch.), it is known only about a ch. that transmits a refresh signal, but not about other channels, whether or not it is alive during sleep. Furthermore, if a ch. that transmits a refresh signal is fixed, a problem arises that element deterioration (which is problematic in particular in the case of a short-wavelength light source) progresses only in that ch.

Moreover, another conceivable scheme for applying the LPI scheme to 40 GbE or 100 GbE is that a refresh signal for checking whether or not a link is alive during sleep is transmitted over each ch., or the like. However, this scheme would cause the problem that, if the timing of a refresh signal in each ch. coincides, the power consumption at that timing increases, making noise increase additionally. If the timing of transmitting a refresh signal during sleep is staggered in order to solve this problem, peak power consumption is lower and hence noise is smaller, but with less effect in total power consumption reduction achieved.

Accordingly, an object of the present invention is to provide a communication device and a power saving method in a data transmission system that can achieve the prevention of element deterioration occurring when a check signal is transmitted during sleep, as well as reductions of transmission noise and power consumption.

Solution to Problem

A power saving device according to the present invention is a communication device connected to another communication device through transmission/reception links corresponding to multiple channels, respectively, characterized by comprising: communication means corresponding to the multiple channels, respectively; and a control means that interrupts transmission outputs of the communication means when there is no data for transmission, and sequentially changes, among the multiple channels, a channel that transmits a check signal for checking a link state during a period in which the transmission outputs are kept interrupted.

A power saving method according to the present invention is a power saving method in a data transmission system that includes first and second communication devices connected through transmission/reception links corresponding to multiple channels, respectively, characterized in that the first communication device interrupts transmission outputs when there is no data for transmission, and sequentially changes, among the multiple channels, a channel that transmits a check signal for checking a link state during a period in which the transmission outputs are kept interrupted.

A data transmission system according to the present invention is a data transmission system including first and second communication devices connected through transmission/reception links corresponding to multiple channels, respectively, characterized in that the first communication device interrupts transmission outputs when there is no data for transmission, and sequentially changes, among the multiple channels, a channel that transmits a check signal for checking a link state during a period in which the transmission outputs are kept interrupted.

Advantageous Effects of Invention

According to the present invention, it is possible to achieve the prevention of element deterioration occurring when a check signal is transmitted during sleep, as well as reductions of transmission noise and power consumption.

DESCRIPTION OF EMBODIMENTS

According to an exemplary embodiment of the present invention, in transmission/reception links that correspond to respective ones of multiple channels, transmission outputs are interrupted when there is no data for transmission and, during the period in which the transmission outputs are kept interrupted, a check signal (also referred to as a heart beat signal or a refresh signal) is transmitted for periodically checking the state of a link, wherein a channel that transmits the check signal is changed each time transmission outputs are interrupted, or during the period in which transmission outputs are kept interrupted. The changing of a channel that transmits a check signal may be made in channel order or at random. Moreover, before transmission outputs are interrupted, it may be notified from a sending side to a receiving side that the transmission outputs will be interrupted, and when there arises a signal to transmit, a restoration signal for returning from the state of interruption to a normal state can be notified. Further, it is also possible that a period of transmitting a check signal is notified and, based on this period, a transition to power saving operation is made. On the receiving side, it is also possible to cut off the supply of power based on the notified period.

In a power saving method according to an exemplary embodiment of the present invention, for example, in 40 GbE/100 GbE and other multi-lane transmission technologies, sleep operation is introduced when there is no data for transfer, whereby power saving is achieved. In addition to this, a channel that transmits a check signal is changed, whereby it is possible to avoid element deterioration in a specific channel, and further, to achieve reductions in transmission noise and power consumption when a check signal is transmitted. Hereinafter, exemplary embodiments of the present invention will be described by taking a wavelength division multiple system with N wavelengths (N is a natural number; the same will apply hereinafter) as an example.

1. First Exemplary Embodiment 1.1) System Configuration

Figure 1:
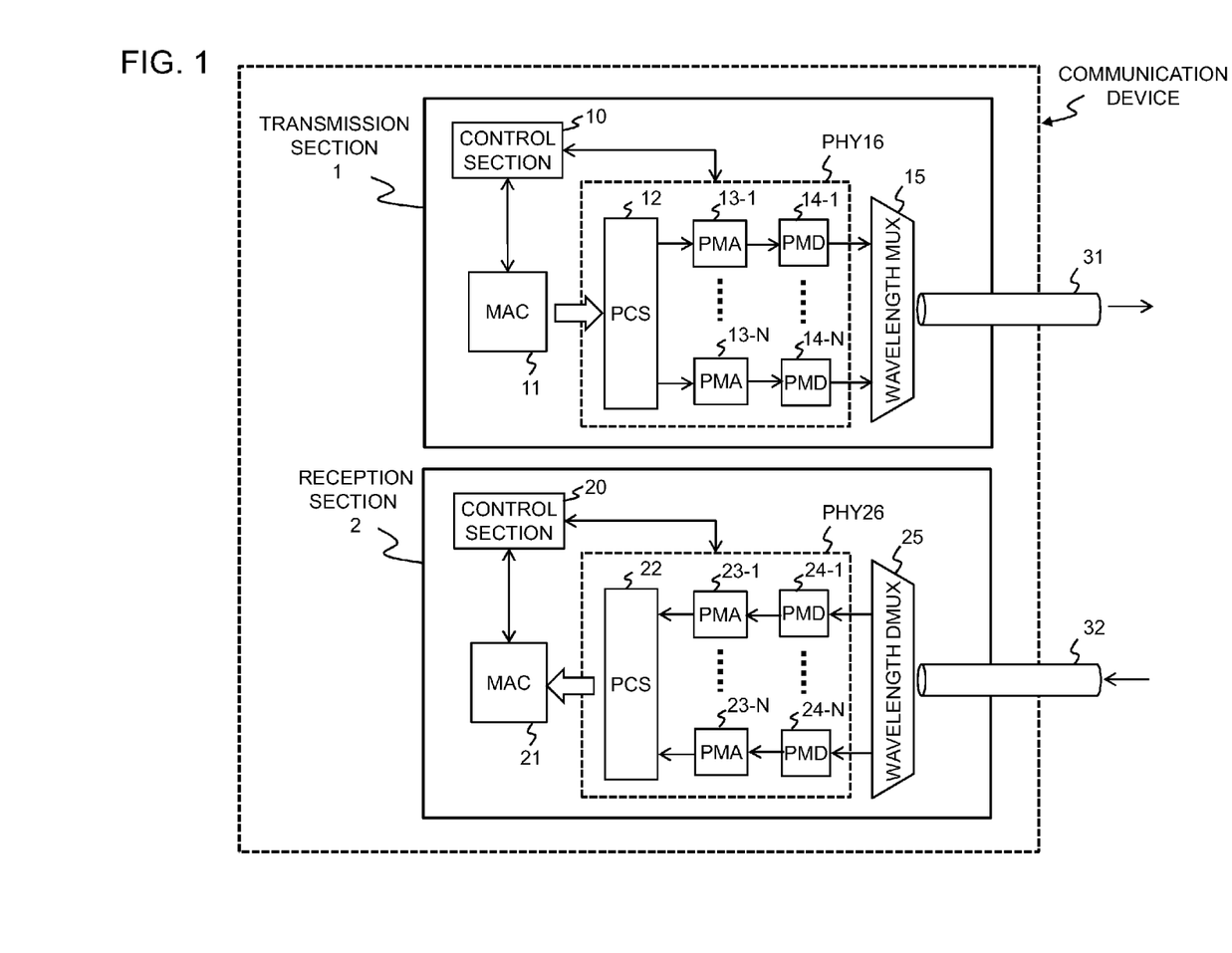
FIG. 1 is a block diagram showing a transmission section and a reception section of a communication device in a data transmission system according to a first exemplary embodiment of the present invention.

Referring to FIG. 1, a communication device in a data transmission system according to the present exemplary embodiment includes a transmission section 1, a reception section 2, and fibers 31 and 32. The transmission section 1 and reception section 2 each accommodate multiple N channels (hereinafter, abbreviated to ch.). Although FIG. 1 shows only a communication device on one end, a counterpart communication device exists on the other end through the fibers 31 and 32, and the transmission section 1 and reception section 2 are connected to the counterpart's reception section and transmission section, respectively.

The transmission section 1 includes a control section 10, a MAC (Medium Access Control) 11, a wavelength MUX (multiplexer) 15, and a PHY (physical layer device) 16, and the PHY 16 includes a PCS (Physical Coding Sublayer) 12, PMAs (Physical Medium Attachments) 13-1 to 13-N, and PMDs (Physical Medium Dependents) 14-1 to 14-N. The reception section 2 includes a control section 20, a MAC 21, a wavelength DMUX (demultiplexer) 25, and a PHY 26, and the PHY 26 includes a PCS 22, PNAs 23-1 to 23-N, and PMDs 24-1 to 24-N. Note that the control section 10 of the transmission section 1 can control the PHY 16 for the sleep operation and the interruption of transmission output for each channel, depending on the presence or absence of data for transmission, while the control section 20 of the reception section 2, when receiving information such as a notification of the interruption of transmission output and a restoration notification from the counterpart communication device, can control the PHY 26 for power saving for each channel in accordance with the information, which will be described later. Note that power saving control functions of the control sections 10 and 20, which will be described later, can also be implemented by executing programs on a computer (a program-controlled processor, CPU or the like) that controls operations of the communication device.

Figure 2:
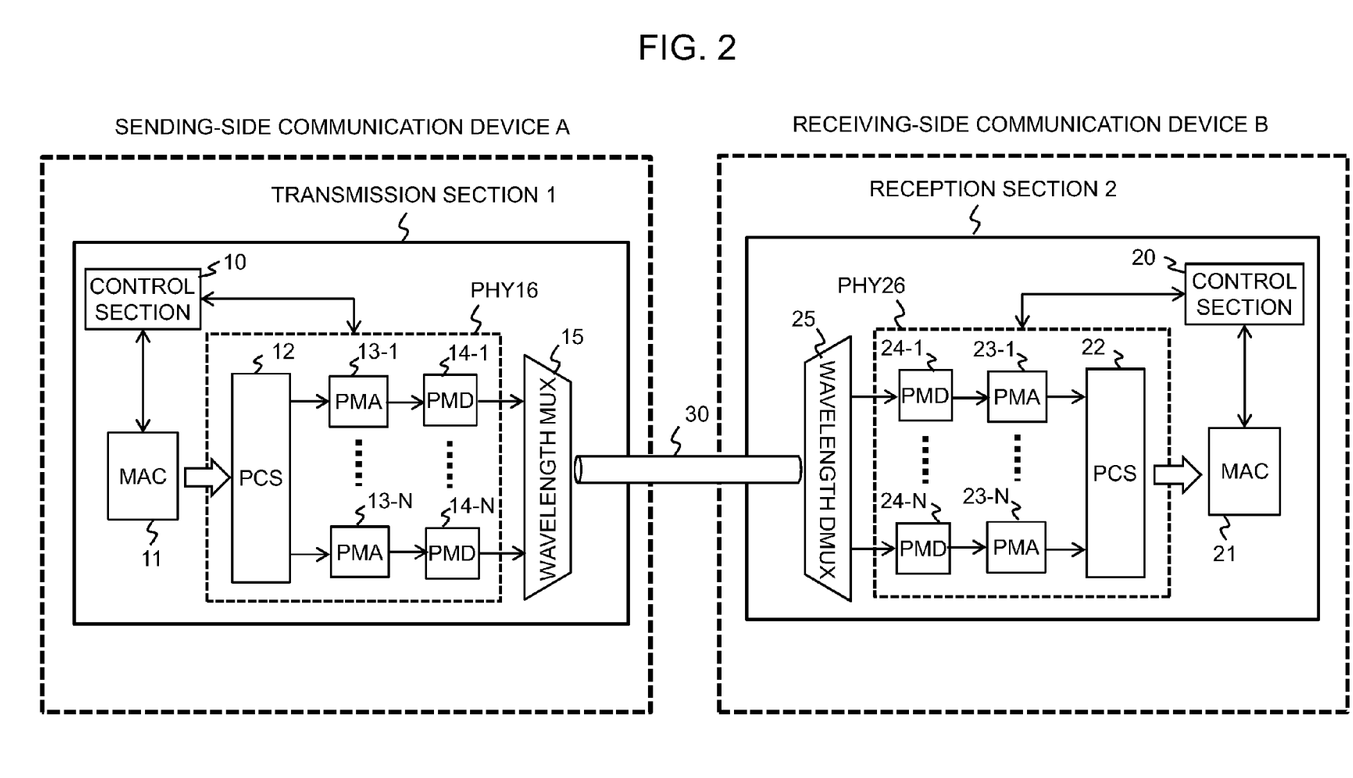
FIG. 2 is a schematic diagram of the data transmission system according to the first exemplary embodiment of the present invention.

As shown in FIG. 2, assuming that a sending-side communication device A and a receiving-side communication device B are connected through an optical transmission line 30, a transmission section of the sending-side communication device A corresponds to the transmission section 1 shown in FIG. 1 and a reception section of the receiving-side communication device B corresponds to the reception section 2 shown in FIG. 1. Hereinafter, operations according to the present exemplary embodiment will be described in detail by using a transmission system shown in FIG. 2.

1.2) Operation

Figure 3:
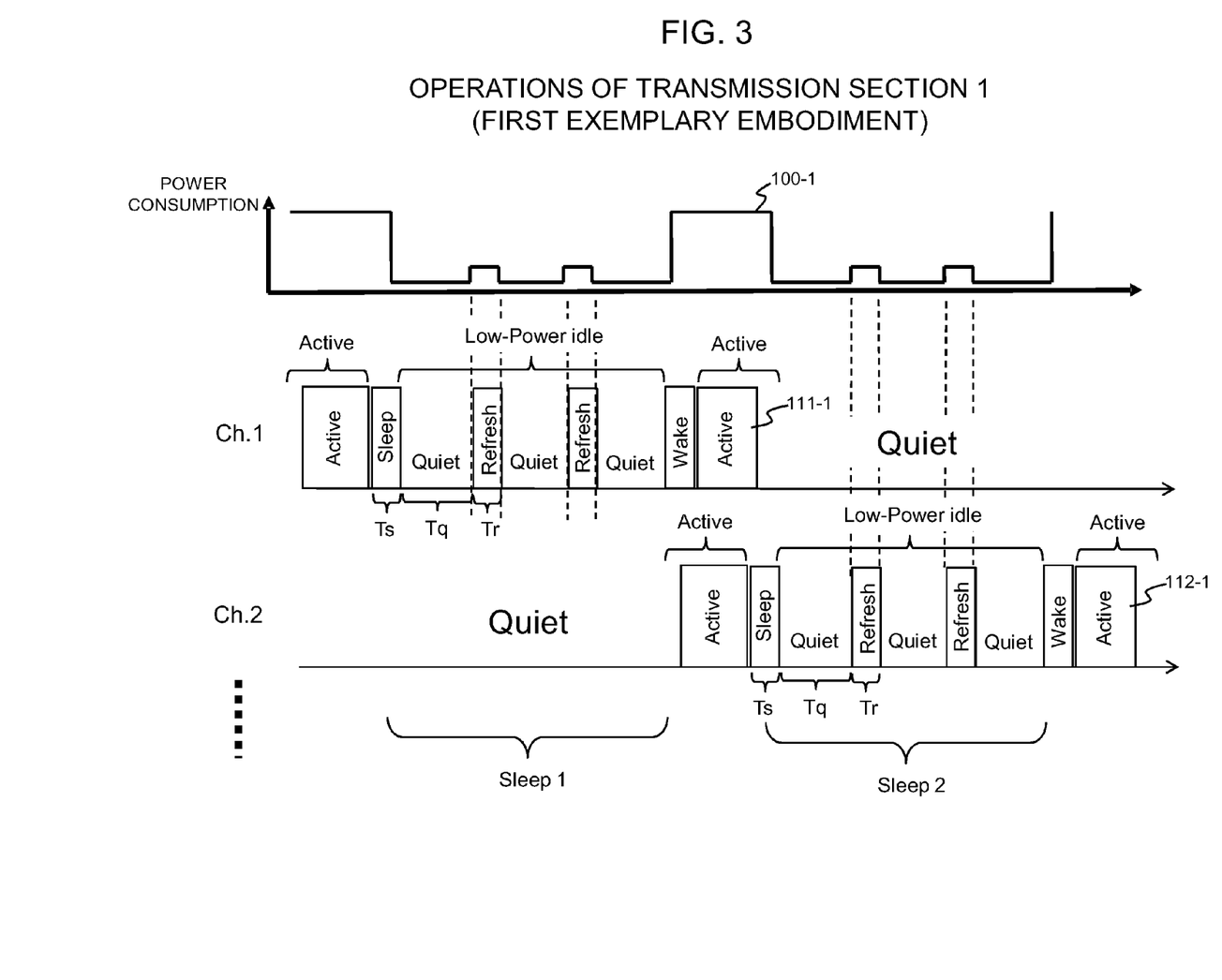
FIG. 3 is a timing diagram showing operations of the transmission section in the data transmission system according to the first exemplary embodiment of the present invention.

Operations on the sending and receiving sides in the present exemplary embodiment will be described with reference to FIGS. 3 to 6. In FIG. 3, waveforms 100-1 represent changes in the power consumption of the transmission section 1, while waveforms 111-1 and 112-1 represent the operation timings of channels ch.1 and ch.2, respectively. Although only two channels ch.1 and ch.2 are shown here to avoid complexity, similar operations apply to all channels of N wavelengths. Moreover, in FIG. 4, waveforms 100-2 represent changes in the power consumption of the reception section 2, while waveforms 111-2 and 112-2 represent the operation timings of the sending-side channel ch.1 and the receiving-side channel ch.1, respectively. Although only the channel ch.1 is shown here to avoid complexity, similar operations apply to all channels of N wavelengths.

Figure 5:
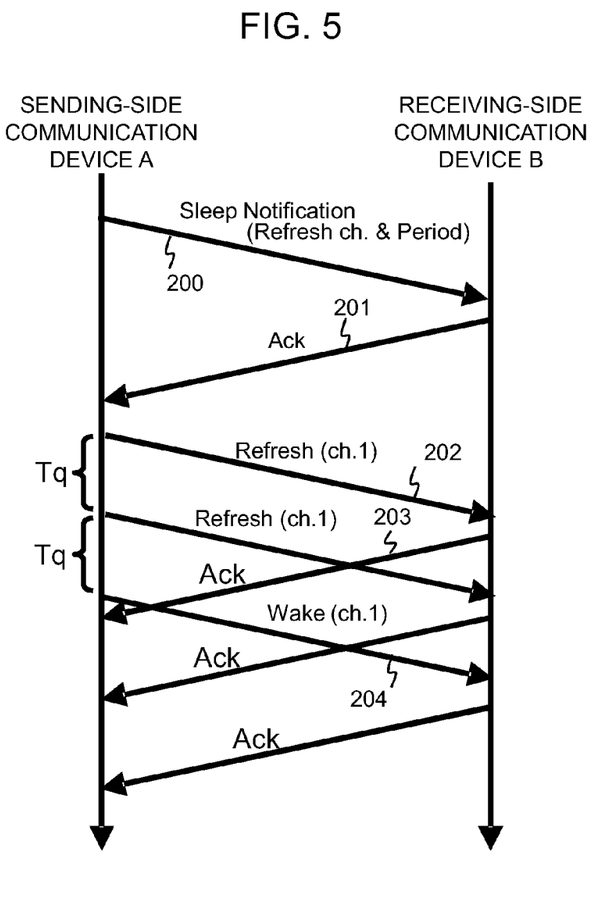
FIG. 5 is a sequence diagram showing operations in the data transmission system according to the first exemplary embodiment of the present invention.

First, operations of the transmission section 1 of the sending-side communication device A will be described with reference to FIGS. 3 and 5. The control section 10 of the transmission section 1 monitors the amount of data for transfer at the MAC 11 and, when there is no data for transfer, controls the MAC 11 and PHY 16 so as to fall in a sleep state. When receiving an instruction for sleep, the MAC 11 sends a sleep notification signal to the counterpart station (receiving-side communication device B) through the fiber 31 to notify that it will fall in a sleep state, and also sends the counterpart station a channel ch. that will transmit a check signal (refresh signal) for monitoring the link state and a transmission period thereof (Operation 200 in FIG. 5). The counterpart station, when receiving the sleep signal, refresh ch. and period information, returns an Ack signal (Operation 201).

The control section 10 of the transmission section 1, after outputting the sleep signal, turns off the output of the PHY 16 for a predefined period of time (Tq) (Quiet), as shown in FIG. 3. After the period of time Tq has elapsed, the control section 10 turns on the PHY 16 and sends the counterpart station a refresh signal for checking the link state of a selected ch. for a period of time Tr (Operation 202). The counterpart station, when receiving the refresh signal, returns Ack (Operation 203).

Figure 6A:
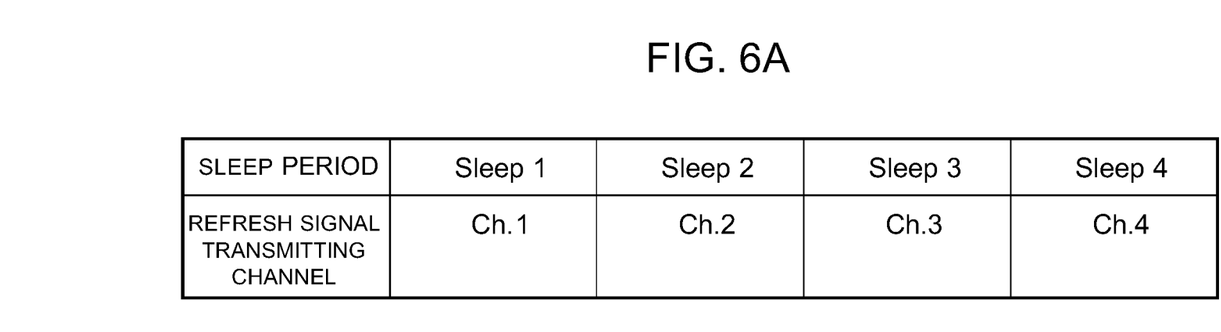
FIG. 6 is a diagram showing examples of a channel that transmits a refresh signal, which is transmitted during a sleep period, in the data transmission system according to the first exemplary embodiment of the present invention.
Figure 6B:
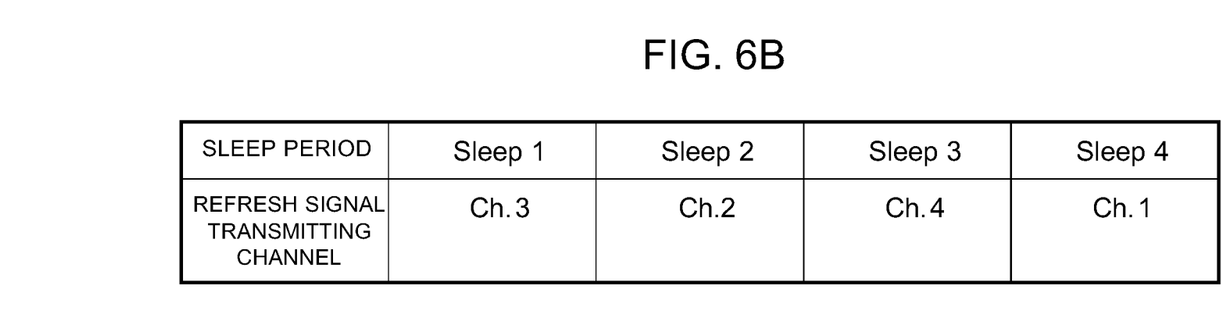

A refresh signal, which is sent out from the transmission section 1, is transmitted over a minimum number of chs. of the multiple chs., which is one ch. in the present example. Accordingly, the power consumed when a refresh signal is transmitted can be minimized. Moreover, a ch. that transmits a refresh signal is not fixed to a specific ch. but is controlled so as to be changed in each sleep operation. For example, chs. may be varied in channel order, in such a manner that it is the ch.1 during a first sleep state, and it is the ch.2 during a second one, and so on, as shown in FIG. 6A. Alternatively, chs. may be varied at random, as shown in FIG. 6B. It is possible to vary chs. at random because a ch. that transmits a refresh signal and its period are notified from the sending side to the receiving side each time a transition to sleep operation is made.

When data for transfer is input to the MAC 11, the control section 10 instructs the MAC 11 and PHY 16 to restore to a normal state from the sleep state. When receiving the instruction for restoration, the MAC 11 sends the counterpart station a wake signal for notifying the counterpart station of its restoration, through the fiber 31 (Operation 204). At this time, if the reception section 2 is in a power saving state in synchronization with the transmission section 1, which will be described later, it is necessary that the wake signal, similarly to a refresh signal, should be sent after the period of time Tq has elapsed since a refresh signal was sent out.

Figure 4:
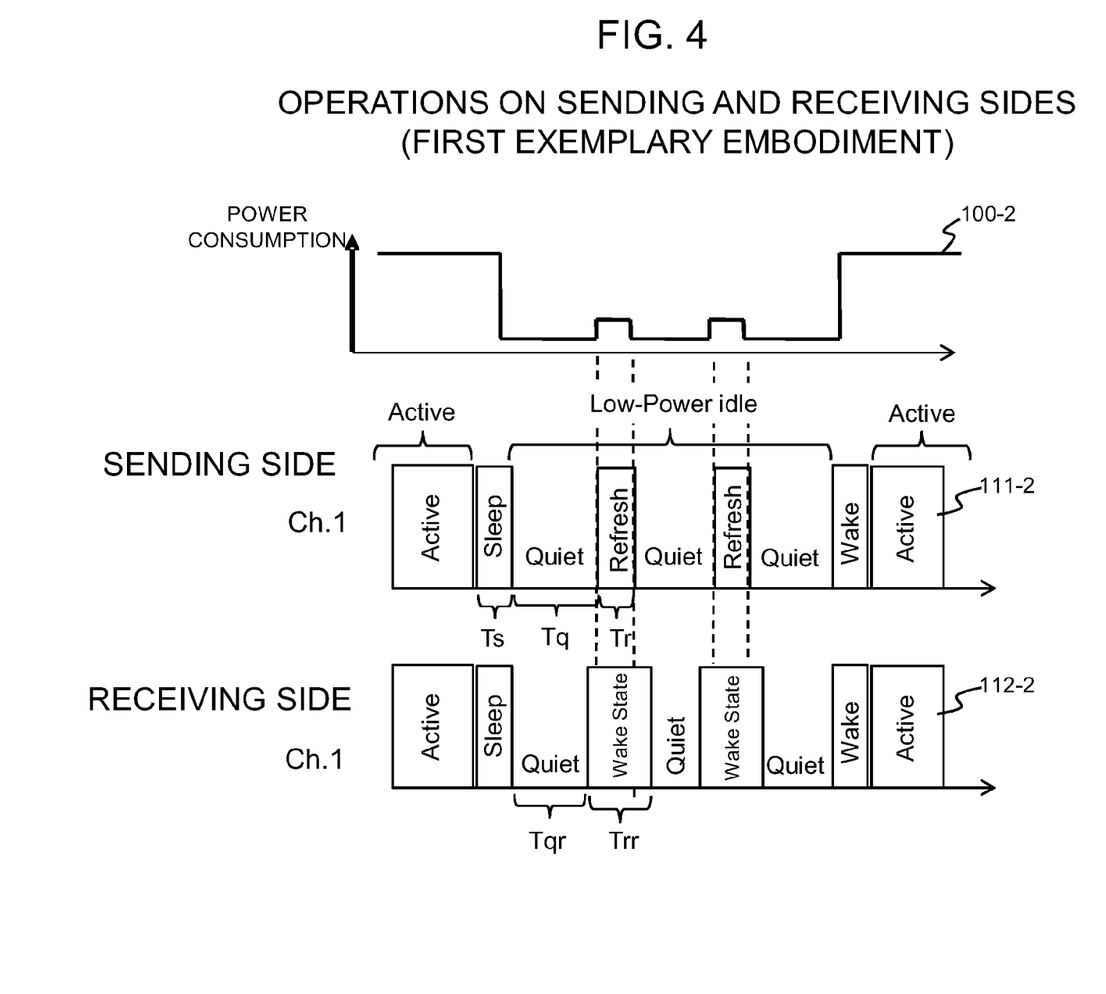
FIG. 4 is a timing diagram showing operations on a sending side and a receiving side in the data transmission system according to the first exemplary embodiment of the present invention.

Next, operations of the reception section 2 of the receiving-side communication device B will be described with reference to FIGS. 4 and 5. The receiving side falls in a sleep state, triggered by a sleep signal notified from the sending side. At this time, although there is an option not particularly to employ power saving operation, the receiving side can also be turned off in synchronization with the sending side in order to minimize power consumption. This method will be described hereinafter.

The MAC 21 of the reception section 2 of the receiving-side communication device B, when receiving a sleep signal, a ch. that will transmit a refresh signal, and its period information, which are notified from the sending-side communication device A (Operation 200), notifies these to the control section 20. The control section 20, based on these notified information, controls the PHY 26 to turn it off, and returns Ack to the sending-side communication device A (Operation 201). The PHY 26 remains off for a period of time Tqr (Tqr<T1), which takes into consideration the rising times of the sending-side PHY 16 and receiving-side PHY 26. Since Tqr takes into consideration the rising times of the sending-side PHY 16 and receiving-side PHY 26, a refresh signal sent from the sending side can be adequately received when wake is brought about after the period of time Tqr (see FIG. 4). Note that when a wake signal transmitted at the same period as a sleep notification is received, Ack is returned to the counterpart station, and normal operation is restored.

1.3) Effects

As described above, according to the present exemplary embodiment, when a check signal (heart beat signal or refresh signal) is transmitted during a period in which transmission outputs are kept interrupted in a case where there is no data for transmission, a channel that transmits such a check signal is changed each time transmission outputs are interrupted. The changing of a channel that transmits a check signal may be made in channel order or at random. A channel that transmits a check signal is changed in this manner, whereby it is possible to lower the power required when a check signal is transmitted to the minimum as shown at the power consumption waveforms 100-1 and 100-2 in FIGS. 3 and 4, and so to achieve further power saving.

2. Second Exemplary Embodiment

In the above-described first exemplary embodiment, a channel that transmits a check signal is changed each time transmission outputs are interrupted, and therefore a channel that transmits a check signal is fixed during a period in which transmission outputs are kept interrupted. On the other hand, according to a second exemplary embodiment of the present invention, a channel that transmits a check signal is changed during a period in which transmission outputs are kept interrupted, whereby similar effects can be obtained. Hereinafter, a description will be given of a power saving method according to the second exemplary embodiment of the present invention, using the transmission system shown in FIG. 2.

Figure 7:
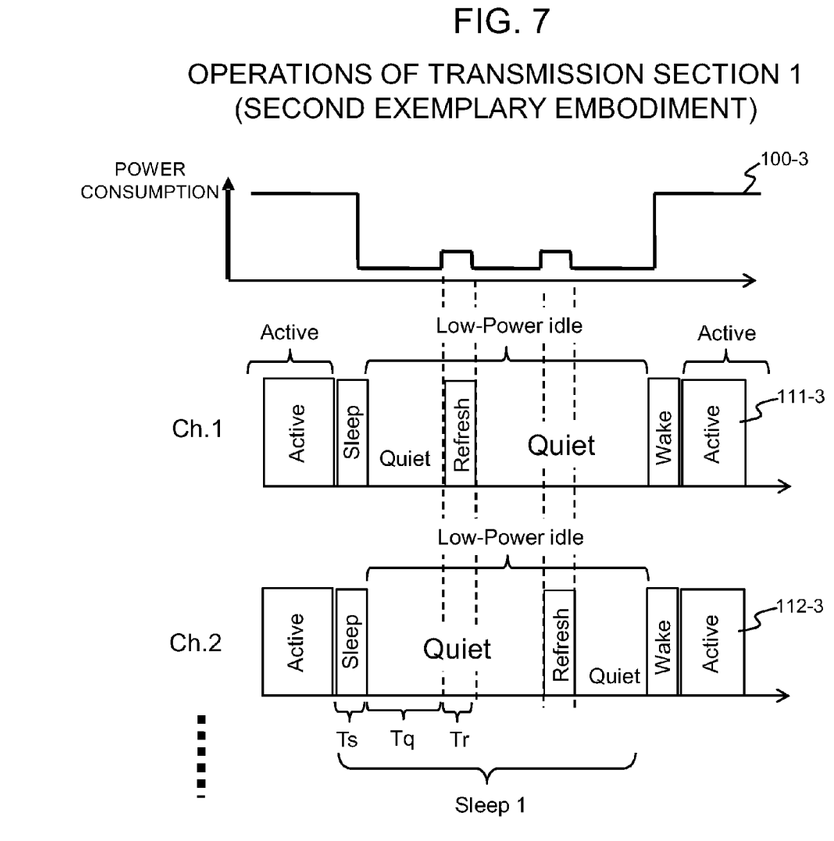
FIG. 7 is a timing diagram showing operations of a transmission section in a data transmission system according to a second exemplary embodiment of the present invention.

Referring to FIG. 7, waveforms 100-3 represent changes in the power consumption of the transmission section 1, while waveforms 111-3 and 112-3 represent the operation timings of the channels ch.1 and ch.2, respectively. Although only two channels ch.1 and ch.2 are shown here to avoid complexity, similar operations apply to all channels of N wavelengths.

In the present exemplary embodiment, among the chs., a ch. that transmits a refresh signal is changed during each sleep operation after a sleep signal is sent out until a wake signal is sent out. In the example shown in FIG. 7, a channel that transmits a check signal is changed at predetermined intervals during each sleep period, in such a manner that during a sleep period (Sleep 1), a refresh signal is transmitted only over ch.1 after Tq has elapsed since a sleep signal is transmitted, and a refresh signal is transmitted only over ch.2 after another Tq has elapsed, and so on.

Figure 8:
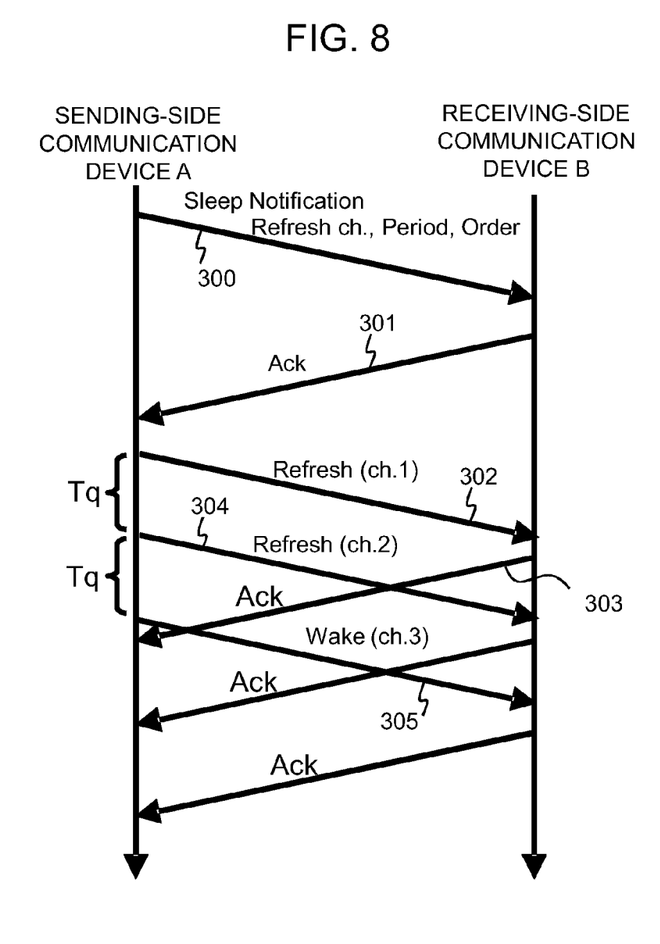
FIG. 8 is a sequence diagram showing operations in the data transmission system according to the second exemplary embodiment of the present invention.

Operations of the transmission section 1 of the sending-side communication device A will be described with reference to FIGS. 7 and 8. The MAC 11 sends the counterpart station (receiving-side communication device B) a sleep notification signal, which notifies the counterpart station that it will fall in a sleep state, in accordance with control by the control section 10 of the transmission section 1, and also sends the counterpart station a ch. that will transmit a check signal (refresh signal) for monitoring the link state, as well as a period and order thereof (Operation 300 in FIG. 8). The counterpart station, when receiving the sleep signal, refresh ch. and order information, returns an Ack signal (Operation 301).

The control section 10 of the transmission section 1, after sending out the sleep signal, turns off the output of the PHY 16 for a predefined period of time (Tq) (Quiet), as shown in FIG. 7. After the period of time Tq has elapsed, the control section 10 turns on only the ch.1 of the PHY 16 and sends the counterpart station a refresh signal for checking the link state of the ch.1 for a period of time Tr (Operation 302). When receiving the refresh signal, the counterpart station, in response to this, returns Ack (Operation 303). After another period of time Tq has elapsed, the control section 10 turns on only ch.2 of the PHY 16 and sends the counterpart station a refresh signal for checking the link state of the ch.2 for a period of time Tr (Operation 304). Note that a refresh signal, which is sent out from the transmission section 1, only needs to be transmitted over a minimum number of chs. of the multiple chs. In this example, it is transmitted only over one ch., and accordingly the power consumed when a refresh signal is transmitted can be minimized.

Figure 9A:
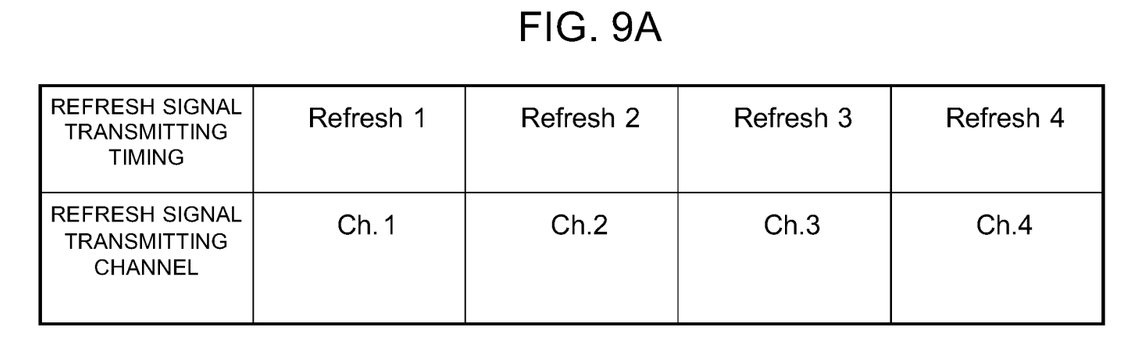
FIG. 9 is a diagram showing examples of a refresh signal-transmitting channel, which transmits a refresh signal, in the data transmission system according to the second exemplary embodiment of the present invention.
Figure 9B:
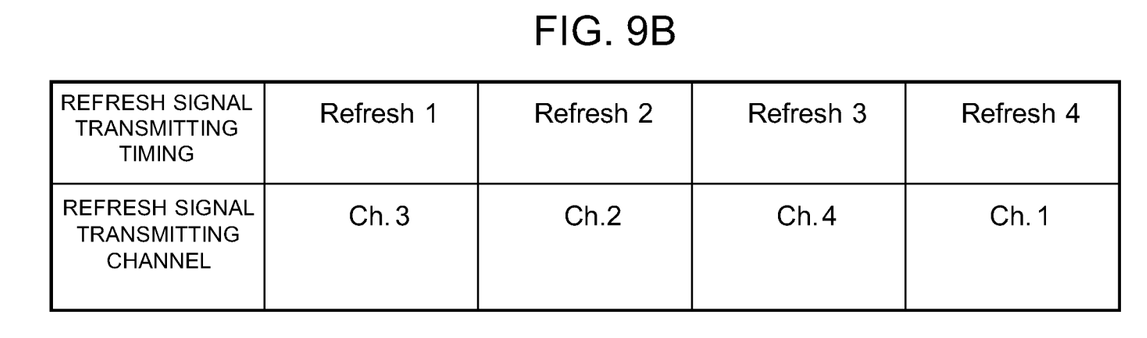

As described above, a ch. that transmits a refresh signal is not fixed to a specific ch. but is controlled so as to be changed at predetermined intervals during sleep operation. For example, channels may be varied in channel order, such as the order of ch.1, ch.2 and so on, after each lapse of a predetermined period of time during a sleep period as shown in FIG. 9A, or may be varied at random as shown in FIG. 9B. It is possible to vary chs. at random because a ch. that transmits a check signal (refresh signal) and a period and order thereof are notified when a sleep notification is made.

When data for transfer is input to the MAC 11, the control section 10 instructs the MAC 11 and PHY 16 to restore to a normal state from the sleep state. When receiving the instruction for restoration, the MAC 11 sends the counterpart station a wake signal for notifying the counterpart station of its restoration, through the fiber 31 (Operation 305). At this time, if the reception section 2 is in a power saving state in synchronization with the transmission section 1, it is necessary that the wake signal, similarly to a refresh signal, should be sent after the period of time Tq has elapsed since a refresh signal was sent out, as described with FIG. 4.

Power saving operation of the reception section 2 in synchronization with the transmission section 1 can be implemented as in the first exemplary embodiment, and therefore a description thereof will be omitted.

As described above, according to the present exemplary embodiment, when a check signal (heart beat signal or refresh signal) is transmitted during a period in which transmission outputs are kept interrupted in a case where there is no data for transmission, a channel that transmits such a check signal is changed at predetermined intervals during the period in which the transmission outputs are kept interrupted. The changing of a channel that transmits a check signal may be made in channel order or at random. A channel that transmits a check channel is changed in this manner, whereby it is possible to reduce the power required on check signal transmission to the minimum as shown at the power consumption waveforms 100-3 in FIG. 7, and so to achieve further power saving. Moreover, although a description is given of a case of wavelength multiplex in the present exemplary embodiment, the present exemplary embodiment can be implemented similarly in a transmission system using as many fiber lines as the number of channels.

3. Additional Statements

Part or all of the above-described exemplary embodiments can also be stated as in, but is not limited to, the following additional statements.

(Additional Statement 1)

A communication device connected to another communication device through transmission/reception links corresponding to multiple channels, respectively, characterized by comprising:

communication means corresponding to the multiple channels, respectively; and a control means that interrupts transmission outputs of the communication means when there is no data for transmission, and sequentially changes, among the multiple channels, a channel that transmits a check signal for checking a link state during a period in which the transmission outputs are kept interrupted.

(Additional Statement 2)

The communication device according to additional statement 1, characterized in that the control means sequentially changes a channel that transmits the check signal each time the communication means interrupt transmission outputs.

(Additional Statement 3)

The communication device according to additional statement 1, characterized in that the control means sequentially changes a channel that transmits the check signal during the period in which the communication means keep interrupting transmission outputs.

(Additional Statement 4)

The communication device according to any one of additional statements 1 to 3, characterized in that a channel that transmits the check signal is changed in channel order.

(Additional Statement 5)

The communication device according to any one of additional statements 1 to 3, characterized in that a channel that transmits the check signal is changed at random.

(Additional Statement 6)

The communication device according to any one of additional statements 1 to 5, characterized in that before the transmission outputs are interrupted, it is notified to the another communication device that transmission outputs will be interrupted, and when there arises data for transmission, a restoration signal is notified to the another communication device.

(Additional Statement 7)

The communication device according to any one of additional statements 1 to 6, characterized in that before the transmission outputs are interrupted, information on the interruption of transmission outputs and information on a channel that will transmit the check signal and on a period thereof are notified to the another communication device.

(Additional Statement 8)

The communication device according to any one of additional statements 1 to 6, characterized in that when the communication means receive information on the interruption of transmission outputs and information on a period of transmitting the check signal for checking a link state from the another communication device, the control means causes the communication means to transit to power saving operation based on the period information.

(Additional Statement 9)

The communication device according to additional statement 8, characterized in that the control means cyclically turns off the power saving operation in synchronization with a check signal sent from the another communication device.

(Additional Statement 10)

A power saving method in a data transmission system that includes first and second communication devices connected through transmission/reception links corresponding to multiple channels, respectively, characterized in that the first communication device interrupts transmission outputs when there is no data for transmission, and sequentially changes, among the multiple channels, a channel that transmits a check signal for checking a link state during a period in which the transmission outputs are kept interrupted.

(Additional Statement 11)

The power saving method according to additional statement 10, characterized in that the first communication device sequentially changes a channel that transmits the check signal each time the transmission outputs are interrupted.

(Additional Statement 12)

The power saving method according to additional statement 10, characterized in that the first communication device sequentially changes a channel that transmits the check signal during the period in which the transmission means keep interrupting the transmission outputs.

(Additional Statement 13)

The power saving method according to any one of additional statements 10 to 12, characterized in that a channel that transmits the check signal is changed in channel order.

(Additional Statement 14)

The power saving method according to any one of additional statements 10 to 12, characterized in that a channel that transmits the check signal is changed at random.

(Additional Statement 15)

The power saving method according to any one of additional statements 10 to 14, characterized in that before interrupting the transmission outputs, the first communication device notifies the second communication device that transmission outputs will be interrupted and, when there arises data for transmission, notifies a restoration signal to the second communication device.

(Additional Statement 16)

The power saving method according to any one of additional statements 10 to 15, characterized in that before interrupting the transmission outputs, the first communication device notifies the second communication device of information on the interruption of transmission outputs and information on a channel that will transmit the check signal and on a period thereof.

(Additional Statement 17)

The power saving method according to any one of additional statements 10 to 16, characterized in that when the first communication device receives information on the interruption of transmission outputs and information on a period of transmitting the check signal for checking a link state from the second communication device, the first communication device transits to power saving operation based on the period information.

(Additional Statement 18)

The power saving method according to additional statement 17, characterized in that the first communication device cyclically turns off the power saving operation in synchronization with a check signal sent from the second communication device.

(Additional Statement 19)

A data transmission system including first and second communication devices connected through transmission/reception links corresponding to multiple channels, respectively, characterized in that the first communication device interrupts transmission outputs when there is no data for transmission, and sequentially changes, among the multiple channels, a channel that transmits a check signal for checking a link state during a period in which the transmission outputs are kept interrupted.

(Additional Statement 20)

The data transmission system according to additional statement 19, characterized in that the first communication device sequentially changes a channel that transmits the check signal each time the transmission outputs are interrupted.

(Additional Statement 21)

The data transmission system according to additional statement 19, characterized in that the first communication device sequentially changes a channel that transmits the check signal during the period in which the transmission means keep interrupting transmission outputs.

(Additional Statement 22)

The data transmission system according to any one of additional statements 19 to 21, characterized in that a channel that transmits the check signal is changed in channel order.

(Additional Statement 23)

The data transmission system according to any one of additional statements 19 to 21, characterized in that a channel that transmits the check signal is changed at random.

(Additional Statement 24)

The data transmission system according to any one of additional statements 19 to 23, characterized in that before interrupting the transmission outputs, the first communication device notifies the second communication device that transmission outputs will be interrupted and, when there arises data for transmission, notifies a restoration signal to the second communication device.

(Additional Statement 25)

The data transmission system according to any one of additional statements 19 to 24, characterized in that before interrupting the transmission outputs, the first communication device notifies the second communication device of information on the interruption of transmission outputs and information on a channel that will transmit the check signal and on a period thereof.

(Additional Statement 26)

The data transmission system according to any one of additional statements 19 to 25, characterized in that when the first communication device receives information on the interruption of transmission outputs and information on a period of transmitting the check signal for checking a link state from the second communication device, the first communication device transits to power saving operation based on the period information.

(Additional Statement 27)

The data transmission system according to additional statement 26, characterized in that the first communication device cyclically turns off the power saving operation in synchronization with a check signal sent from the second communication device.

(Additional Statement 28)

A program causing a computer to function, wherein the computer is in a communication device connected to another communication device through transmission/reception links corresponding to multiple channels, respectively, characterized by causing the computer to implement:

communication functions corresponding to the multiple channels, respectively; and a function of interrupting transmission outputs of the communication means when there is no data for transmission, and sequentially changing, among the multiple channels, a channel that transmits a check signal for checking a link state during a period in which the transmission outputs are kept interrupted.

INDUSTRIAL APPLICABILITY

The present invention is applicable to multi-lane transmission technologies typified by 40 GbE/100 GbE.

REFERENCE SIGNS LIST

1 Transmission section
2 Reception section
10, 20 Control section
11, 21 MAC
12, 22 PCS
13-1 to 13-N, 23-1 to 23-N PMA
14-1 to 14-N, 24-1 to 24-N PMD
15 Wavelength MUX
25 Wavelength DMUX
30, 31, 32 Fiber

The invention claimed is:

1. A communication device connected to another communication device through transmission/reception links corresponding to a plurality of channels, respectively, comprising:

a plurality of communication units corresponding to the plurality of channels, respectively; and a control unit that is configured to
interrupt transmission outputs of the communication units when there is no data for transmission, and sequentially change, among the plurality of channels, a channel that transmits a check signal for checking a link state during at least one period in which the transmission outputs are kept interrupted.

2. The communication device according to claim 1, wherein the control unit sequentially changes the channel that transmits the check signal each time the communication units interrupt the transmission outputs.

3. The communication device according to claim 1, wherein the control unit sequentially changes the channel that transmits the check signal during each of periods in which the communication units keep interrupting the transmission outputs.

4. The communication device according to claim 1, wherein the channel that transmits the check signal is changed in channel order.

5. The communication device according to claim 1, wherein the channel that transmits the check signal is changed at random.

6. The communication device according to claim 1, wherein before the transmission outputs are interrupted, the control unit notifies the another communication device that the transmission outputs will be interrupted, and when there arises data for transmission, the control unit notifies the another communication device of restoration.

7. The communication device according to claim 1, wherein before the transmission outputs are interrupted, the control unit notifies the another communication device of information on the interruption of the transmission outputs and information on the channel that will transmit the check signal and on the period thereof.

8. A power saving method in a first communication device which is connected to a second communication device through transmission/reception links corresponding to a plurality of channels, respectively, the method comprising:

interrupting transmission outputs when there is no data for transmission; and sequentially changing, among the plurality of channels, a channel that transmits a check signal for checking a link state during at least one period in which the transmission outputs are kept interrupted.

9. A data transmission system including first and second communication devices connected through transmission/reception links corresponding to a plurality of channels, respectively, wherein the first communication device interrupts transmission outputs when there is no data for transmission, and sequentially changes, among the plurality of channels, a channel that transmits a check signal for checking a link state during at least one period in which the transmission outputs are kept interrupted, and the second communication device receives the check signal through the channel which is sequentially changed.

10. The power saving method according to claim 8, wherein the channel that transmits the check signal is sequentially changed each time interrupting the transmission outputs.

11. The power saving method according to claim 8, wherein the channel that transmits the check signal is sequentially changed during each of periods in which the transmission outputs are interrupted.

12. The power saving method according to claim 8, wherein the channel that transmits the check signal is changed in channel order.

13. The power saving method according to claim 8, wherein the channel that transmits the check signal is changed at random.

14. The power saving method according to claim 8, wherein before the transmission outputs are interrupted, the first communication device notifies the second communication device that the transmission outputs will be interrupted, and when there arises data for transmission, the first communication device notifies the second communication device of restoration.

15. The power saving method according to claim 8, wherein before the transmission outputs are interrupted, the first communication device notifies the second communication device of information on the interruption of the transmission outputs and information on the channel that will transmit the check signal and on the period thereof.

16. The data transmission system according to claim 9, wherein the first communication device sequentially changes the channel that transmits the check signal each time interrupting the transmission outputs.

17. The data transmission system according to claim 9, wherein the first communication device sequentially changes the channel that transmits the check signal during each of periods in which the transmission outputs are interrupted.

18. The data transmission system according to claim 9, wherein the channel that transmits the check signal is changed in channel order.

19. The data transmission system according to claim 9, wherein the channel that transmits the check signal is changed at random.

20. The data transmission system according to claim 9, wherein before the transmission outputs are interrupted, the first communication device notifies the second communication device that the transmission outputs will be interrupted, and when there arises data for transmission, the first communication device notifies the second communication device of restoration.

21. The data transmission system according to claim 9, wherein before the transmission outputs are interrupted, the first communication device notifies the second communication device of information on the interruption of the transmission outputs and information on the channel that will transmit the check signal and on the period thereof.

\* \* \* \* \*